(12) United States Patent
Barbe et al.

(10) Patent No.: US 9,940,567 B2
(45) Date of Patent: Apr. 10, 2018

(54) PROCESS FOR THE CONFIGURATION OF A SMART CARD FOR A SINGLE SELECTED APPLICATION

(71) Applicant: GEMALTO SA, Meudon (FR)

(72) Inventors: Serge Barbe, Meudon (FR); Evangelos Spyropoulos, Meudon (FR); Michell Thill, Meudon (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 14/653,804

(22) PCT Filed: Dec. 10, 2013

(86) PCT No.: PCT/EP2013/076077
§ 371 (c)(1),
(2) Date: Jun. 18, 2015

(87) PCT Pub. No.: WO2014/095488
PCT Pub. Date: Jun. 26, 2014

(65) Prior Publication Data
US 2015/0324682 A1    Nov. 12, 2015

(30) Foreign Application Priority Data
Dec. 21, 2012   (EP) .................................. 12306662

(51) Int. Cl.
*G06K 19/06* (2006.01)
*G06K 19/07* (2006.01)
*G06K 19/08* (2006.01)

(52) U.S. Cl.
CPC ... *G06K 19/06187* (2013.01); *G06K 19/0707* (2013.01); *G06K 19/0719* (2013.01); *G06K 19/08* (2013.01)

(58) Field of Classification Search
CPC ......... G06K 19/06187; G06K 19/0707; G06K 19/0719; G06K 19/08
See application file for complete search history.

(56) References Cited

U.S. PATENT DOCUMENTS 6,564,995 B1    5/2003  Montgomery
7,784,692 B1    8/2010  Arrington, III
(Continued)

FOREIGN PATENT DOCUMENTS

WO    WO0247022 A1    6/2002

OTHER PUBLICATIONS

PCT/EP2013/076077 International Search Report, dated Mar. 28, 2014, European Patent Office, P.B. 5818 Patentlaan 2 NL—2280 HV Rijswijk.

(Continued)

*Primary Examiner* — Thien M Le
*Assistant Examiner* — Asifa Habib
(74) *Attorney, Agent, or Firm* — The Jansson Firm; Pehr B. Jansson

(57) ABSTRACT

A process is designed to configure a smart card (CP) comprising a microchip (PE) capable of participating in at least two applications, a magnetic stripe (PM) capable of storing information, action means (MA) capable of acting on the magnetic stripe (PM) to modify certain stored information, a control circuit (MC) capable of controlling the microchip (PE) and the action means (MA), and selection means (MS) capable of allowing the selection of an application. This process comprises a step wherein, if one of the applications is selected, a dedicated piece of information that is representative of that selected application is stored in a location accessible to the control circuit (MC), so that if the microchip (PE) is woken up, the microchip (PE) automati- (Continued)

cally retrieves the dedicated information in order to activate the selected application represented by it.

9 Claims, 1 Drawing Sheet

(56) References Cited

U.S. PATENT DOCUMENTS

| | | | |
|---|---|---|---|
| 9,760,884 B2* | 9/2017 | Wyatt | G06Q 20/341 |
| 2003/0111527 A1* | 6/2003 | Blossom | G06K 19/06187 |
| | | | 235/380 |
| 2009/0159673 A1* | 6/2009 | Mullen | G06K 19/06206 |
| | | | 235/380 |
| 2010/0250812 A1* | 9/2010 | Webb | G06F 21/32 |
| | | | 710/301 |

OTHER PUBLICATIONS

PCT/EP2013/076077 Written Opinion of the International Searching Authority, dated Mar. 28, 2014, European Patent Office, D-80298 Munich.

* cited by examiner

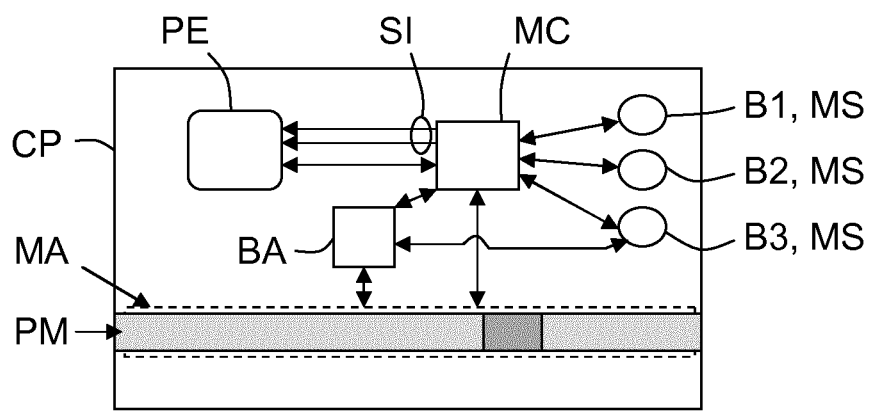

PROCESS FOR THE CONFIGURATION OF A SMART CARD FOR A SINGLE SELECTED APPLICATION

FIELD OF THE INVENTION

The invention relates to smart cards, more precisely the configuration of such smart cards.

"Smart card" in this document means a card made of plastic or synthetic material, comprising at least one microchip accessible by an external contact or contactless reader and capable of participating in at least two applications (possibly of the security type), at least one magnetic stripe accessible by a magnetic reader and capable of potentially storing the same applications, action means (generally of the electromagnetic type) capable of acting on the magnetic stripe so that it can store one of the applications Besides, all applications are covered here, as long as they require the execution of operations and/or functions by at least one electronic chip. Thus, for example, the application may be a credit, debit or prepayment application.

BACKGROUND OF THE INVENTION

As known to the person of the art, the use of a magnetic stripe or a microchip for storing information required for the execution of applications on a small-sized physical medium was proposed very long ago. As a result, depending on the country or even the applications in consideration, the choice of the type of storage can vary, which is problematic when a user encounters a card reader that is not adapted for the type of storage of their card and/or if their card is not adapted for the relevant application.

One of the aforementioned problems can be overcome by fitting the card with both a microchip and a magnetic stripe in which the information required for executing an application is stored redundantly. Another aforementioned problem can be overcome if the card is equipped with selection means allowing the user to select one out of several possible applications, and thus to configure it via its control means for exclusive use for that selected application.

Without such selection means, some cards cannot be configurable, which forces their users to have several cards, dedicated respectively to different applications. For example, in the field of bank cards, some users are forced to have one card dedicated to credit, one card dedicated to debit and one card dedicated to prepayment.

Reconfigurable cards with two types of storage are then particularly useful. However, each card configuration resulting from the selection of an application necessitates the parallel powering of the microchip, the action means, the control means and the selection means, which consumes a lot of power. The microchip of the card must be powered to control the configuration of the magnetic stripe, but the power consumption makes it impossible to configure the application, that is to say both the microchip and the magnetic stripe. That would not be a problem if the selection of an application, and thus the configuration, were to be carried out after the card is inserted in a reader that can supply it with electrical power. Unfortunately, the magnetic stripe can only be selected and configured before the card is inserted in a reader and thus exclusively with the quantity of power that is stored in the battery, which is known to be insufficient for operating the system for updating the magnetic stripe and powering the microchip.

SUMMARY OF THE INVENTION

The invention is thus aimed at solving the aforementioned problem, namely that of allowing a user to select an application both on the magnetic stripe and on the microchip of the card.

To that end, it particularly proposes a process designed for configuring a smart card comprising a microchip capable of participating in at least two applications, a magnetic stripe capable of storing information, action means capable of acting on the magnetic stripe to modify certain stored information, a control circuit capable of controlling the microchip and the action means, and selection means capable of allowing the selection of an application.

The process is characterised by the fact that it comprises a step wherein, if one of the applications is selected, the control circuit stores dedicated information representative of the selected application, so that if the microchip is woken up, it automatically retrieves the dedicated information in order to activate the corresponding application.

The method according to the invention may comprise other characteristics that may be taken separately or combined with each other, particularly:
  the dedicated information may be delivered permanently by the control circuit to at least one output included in it and which is coupled to an input of the microchip, so that it can be read by the microchip when it is powered from outside;
  in a first alternative, the dedicated information may be stored by the control circuit in an internal memory and supplied when requested by the control circuit to the microchip when it is powered from the outside;
  the request may come from the microchip;
  in a second alternative, the dedicated information may be stored by the control circuit in a memory of the smart card that is external to the two elements and can be read by the microchip when it is powered from the outside (the external memory may, for example, be a core memory external to the magnetic stripe).

The invention also proposes a smart card comprising a microchip capable of participating in at least two applications, a magnetic stripe capable of storing information, action means capable of acting on the magnetic stripe to modify certain stored information, a control circuit capable of controlling the microchip and the action means, and selection means capable of allowing the selection of an application.

This smart card is characterised by the fact that the control circuit is further designed, if one of the applications is selected (using its selection means) to trigger the storage of a dedicated piece of information representative of the selected application in a predefined location, so that if the microchip is woken up, it automatically retrieves the dedicated information in order to activate the selected application represented by it.

The smart card according to the invention may comprise other characteristics that may be taken separately or in combination, particularly:
  the control circuit may be designed to continuously deliver the dedicated piece of information to at least one output included in it, which is coupled to an input of the microchip, so that it can be read by the microchip when it is powered from the outside;
  in a first alternative, the control circuit may be designed to store the dedicated piece of information in an internal memory and to supply that dedicated information to the microchip when it is powered from the outside, when requested;

in a second alternative, the control circuit may be designed to control the storage of the dedicated piece of information in a memory of the smart card that is external to the circuit and readable by the microchip when it is powered from the outside.

BRIEF DESCRIPTION OF DRAWINGS

Other characteristics and benefits of the invention will appear in an examination of the detailed description below, and the attached drawing, wherein the single FIGURE is a schematic and functional illustration of an example of smart card fitted with a control device according to the invention.

DETAILED DESCRIPTION

The invention is particularly aimed at proposing a method, and an associated control device D, designed to allow the configuration of a smart card CP so that it only participates in one application selected out of several applications.

In what follows, it is assumed as a non-limitative example that the smart card CP is bank card made of plastic (or synthetic) material. But the invention is not limited to that type of smart card. Indeed, it relates to all types of card comprising at least one microchip and at least one magnetic stripe capable of participating in at least two applications.

In the single FIGURE, an example of a smart card is illustrated schematically, comprising a microchip PE, a magnetic stripe PM, action means MA, a control circuit MC, selection means MS and Bi, and a battery BA.

The battery BA is designed so as to electrically power the action means MA, the control circuit MC and the selection means MS.

It may be noted that the battery BA, the microchip PE, the action means MA, the control circuit MC and the selection means MS may be part of an electronic circuit making up part of the smart card CP.

The microchip PE is designed so as to participate in at least two applications (possibly of the security type). It is accessible via an external reader (contact or contactless type).

The magnetic stripe PM is designed so as to store fixed information (like a conventional magnetic stripe) and variable information (by electronic emulation), particularly relating to the aforementioned applications. It is accessible via an external magnetic reader. It is to be noted that the degree of remanence of the part of the magnetic stripe PM that is responsible for storing the variable information (that is to say the time during which it can store the same information) may vary.

The action means MA are designed so as to act on the magnetic stripe PM in order to modify the variable information stored by it. It is to be noted that the action means MA may be capable of retaining for a longer period a last piece of information from the control circuit MC, which the latter (MC) may have asked them to store in the variable part of the magnetic stripe PM. It is also to be noted that the action means MA may be of the electromagnetic type as regards their components responsible for acting on the variable part of the magnetic stripe PM. In that case, they may for example include one or more micro-coils.

The selection means MS are designed so as to allow the selection of an application by the user. They make up the user interface. Any small-sized selection means where the status can be temporarily modified by the user may be used here. Thus, they could for example take the form of buttons Bi that can be activated by simply pressing them or touch or sensitive zones. Such buttons Bi are managed by the control circuit MC powered by the battery BA.

In the non-limitative example illustrated in the single FIGURE, the selection means MS comprise three buttons B1 (i=1 to 3) that are electrically coupled with the control circuit MC and the battery BA. For example, the first button B1 is dedicated to the selection of a debit application, the second button B2 is dedicated to the selection of a credit application, and the third button B3 is dedicated to the selection of a prepayment application. However, in alternative embodiments, the smart card CP may have any number of buttons.

It can be understood that when the user activates a button Bi, that leads to the generation of a signal (analogue or digital) that is transmitted to the control circuit MC in order to configure the smart card CP and the magnetic stripe PM.

Besides, each button Bi may be possibly associated with an indicator lamp that is designed to show the last one used, and which thus indicates the application selected last.

The control circuit MC is particularly designed so as to control the microchip PE and the action means MA. The control circuit (MC) is also designed so that it intervenes every time the selection means MS have been activated by a user wanting to select one application out of several (at least two), in order to thereby configure the smart card CP for that purpose.

More precisely, according to the invention, when one of the possible applications (three in this case) has been selected, the control circuit MC is designed to trigger the storage of a dedicated piece of information that is representative of the selected application in a predefined location. Such storage is designed to allow the microchip PE, after it has been woken up following the introduction of its smart card CP in a card reader (and thus after it is powered by the reader), to automatically retrieve the dedicated information in order to activate the selected application represented by it.

The storage of the information is controlled by the control circuit MC, and thus requires very little power. As a result, the action means MA can be activated to reconfigure the magnetic stripe PM. The control circuit MC can trigger the writing of the magnetic stripe after the operating mode is selected by the user. In order to minimise consumption and if the magnetic stripe has very high remanence, such reconfiguration of the magnetic stripe PM may be carried out only if the information stored is modified.

For example, if the user activates the first button B1 to select the debit application, that is reported to the control circuit MC and the latter (MC) then triggers the storage of a first piece of dedicated information that is representative of the debit application in a predefined location. Later, when the microchip PE is woken up (and thus powered) by a card reader, it automatically retrieves that first piece of information, possibly via the control circuit MC in order to activate the selected application represented by it.

It is to be noted that a dedicated piece of information may, for example, be defined by one or several bits. One bit alone is sufficient when the number of selectable applications is equal to two (2). As soon as that number exceeds two, each dedicated piece of information must be defined by several bits. For example, when the number is equal to three (3), as in the example described here, each dedicated piece of information can be defined by two bits.

Several embodiments may be envisaged to make a stored piece of dedicated information accessible.

In a first embodiment (illustrated in a non-limitative manner in the single FIGURE), the control circuit MC may be designed to continuously supply the dedicated information to at least one output SI that is included in it and which is coupled with an input of the microchip PE so that it can be read by the microchip PE after it has been woken up (and thus powered) by a card reader. In other words, whether the control circuit MC is on standby or awake, it continuously supplies the dedicated information to at least one of its outputs SI with which it is coupled to the microchip PE. The dedicated information is thus continuously accessible directly by the microchip PE, which advantageously avoids having to wake up the control circuit MC to supply it. That may, for instance, be achieved by configuring an output of the circuit belonging to the control circuit MC with a pull resistor that is connected either to the ground or to the power.

For example, one may use two outputs SI with pull-up and pull-down type resistors to define the voltages that represent the dedicated information that is to be made accessible.

In a second embodiment, the control circuit MC may be arranged to store the dedicated information in an internal memory, which may for example be contained in it, and to supply that dedicated information to the microchip PE after it has been woken up (and thus powered) by a card reader, on request. That second embodiment is not as satisfactory as the first one, because it makes it necessary to wake up the control circuit MC and thus requires an additional expenditure of power.

The request may, for example, come from the microchip PE, after it is woken up by the card reader into which its smart card CP has been introduced. In that case, the dedicated information is preferably transmitted directly to the microchip PE by the control circuit MC via the link connecting them, after it has been read in the internal memory of the control circuit MC.

In a third embodiment, the control circuit MC may be designed to control the storage of the dedicated piece of information in a memory of the smart card CP that is external to the control circuit MC and readable by the microchip PE when it is woken up (and thus powered) by a card reader. That external memory may for example be a core memory which is external to the magnetic stripe PM.

In that third embodiment, the request may, for example, come from the microchip PE, after it is woken up (and powered) by the card reader into which its smart card CP has been introduced. In that case, the microchip directly reads the external memory.

It is important to note that the invention may also be considered from the standpoint of a configuration process that may particularly be used with a smart card CP of the type presented above. The features offered by the use of the process according to the invention are substantially identical to those offered by the smart card CP presented above; only the combination of the main features offered by the process is presented below.

This configuration process comprises a step wherein, if one of the applications in which a smart card CP can participate is selected, a dedicated piece of information that is representative of the application selected by means of the control circuit MC is stored, so that if the microchip PE is woken up, the microchip (PE) automatically retrieves the dedicated information in order to activate the selected application represented by it.

The invention claimed is:

1. A process for configuring a smart card, while not connected to a card reader, to select an application for activation upon a subsequent connection to a card reader, the smart card comprising an internal power source, a microchip capable of participating in at least two applications, a magnetic stripe capable of storing information, action means capable of acting on said magnetic stripe to modify some stored information, a control circuit capable of controlling said microchip and said action means, and selection means capable of allowing the selection of an application, each said application being accessible via said magnetic stripe and via said microchip, the method comprising:
  powering the control circuit using the internal power source;
  while powering the control circuit using the internal power source:
    receiving a user selection of one of said applications from said selection means;
    in response to said user selection of one of said applications:
      operating the control circuit:
        to store a dedicated piece of information representative of said selected application at a location accessible by said microchip; and
        after the representative dedicated information is stored, triggering the action means to store on the magnetic stripe dedicated information corresponding to the selected application, thereby enabling access to said selected application via said magnetic stripe; and
  powering the microchip using the card reader, and while powering the microchip using the card reader:
    operating said microchip, in response to said microchip being woken up by a card reader, to retrieve the dedicated information in order to activate said corresponding application thereby enabling access to said application by the card reader via said microchip.

2. The process according to claim 1, wherein said dedicated information is delivered permanently by said control circuit to at least one output connected to the control circuit and which is coupled to an input of said microchip, so that said dedicated information can be read by said microchip when microchip is powered from the card reader.

3. The process according to claim 1, wherein said dedicated information is stored by said control circuit in an internal memory and supplied upon request by said control circuit to said microchip when microchip is powered from the card reader.

4. The process according to claim 3, wherein said request comes from said microchip.

5. The process according to claim 1, wherein said dedicated information is stored by said control circuit in a memory of said smart card that is external to said control circuit and readable by said microchip when the microchip is powered from the card reader.

6. A smart card comprising an internal power source, a microchip capable of participating in at least two applications, a magnetic stripe capable of storing information, action means capable of acting on said magnetic stripe to modify some stored information, control circuits capable of controlling said microchip and said action means, and selection means capable of allowing the selection of an application, each said application being accessible via said magnetic stripe and via said microchip, wherein said control circuit is designed while powered from the internal power source, in response to a user selection of one of said applications, to trigger the storage of a piece of dedicated information representative of said selected application in a predefined location accessible by said microchip, after the representative dedicated information is stored, the control circuit triggers the action means to store on the magnetic stripe dedicated information corresponding to the selected application, thereby enabling access to said selected application via said magnetic stripe, and said microchip, while powered from the card reader, in response to being woken up by a card reader, automatically retrieves the dedicated information in order to activate the corresponding application represented by the dedicated information thereby enabling access to said application by the card reader via said microchip.

7. The smart card according to claim 6, wherein the control circuit is designed to permanently deliver said dedicated information to at least one output provided by the control circuit and which is coupled to an input of said microchip, so that the at least one output can be read by said microchip when the microchip is powered from the card reader.

8. The smart card according to claim 6, wherein the control circuit is designed to store said dedicated information in an internal memory and to supply that dedicated information to said microchip when the microchip is powered from the card reader, upon request.

9. The smart card according to claim 6, wherein the control circuit is designed to control the storage of said dedicated information in a memory of said smart card which is external to said control circuit and readable by said microchip when the microchip is powered from the card reader.

* * * * *